United States Patent Office 3,532,662
Patented Oct. 6, 1970

3,532,662
PROCESS OF MAKING DISPERSIONS OF PIGMENTS COATED WITH A POLYMER CONTAINING POLAR GROUPS IN LIQUIDS
Derek Arnold Ansdell, Marlow, England, assignor to Imperial Chemical Industries Limited, London, England, a corporation of Great Britain
No Drawing. Filed June 8, 1966, Ser. No. 555,975
Claims priority, application Great Britain, June 10, 1965, 24,606/65
Int. Cl. C08f 47/20, 1/84; C08j 1/46
U.S. Cl. 260—34.2    4 Claims

ABSTRACT OF THE DISCLOSURE

A process for producing a dispersion of pigment particles by making a dispersion of said pigment particles in a liquid continuous phase comprising a first organic liquid containing in solution a polymer containing polar groups and a stabilizer, and modifying the polarity of the continuous phase so that the polymer is insoluble therein by either adding to the dispersion a liquid which is a non-solvent for the polymer or, if said first organic liquid is a mixture of solvent or non-solvent for the polymer, by removing part of the solvent, thereby causing the polymer containing polar groups to be adsorbed on the pigment particles. The stabilizer in the first organic liquid comprises (a) an anchor component which is solvated by the first liquid and non-solvated by the modified liquid and which is associated with the polymer adsorbed on the pigment particles and (b) a pendent chain-like component which is solvated by both the first organic liquid and by the modified liquid.

---

This invention relates to processes of treating dispersed solid particles, such as pigments and metallic powders, with organic polymeric material, to solid particles treated by such processes and to coating compositions containing such treated particles.

Dispersion of pigments and other solid particles in polymeric organic materials, such as paint films laid down from coating compositions or articles made from bulk polymer, e.g. sheets and mouldings, may be improved if the particles are treated with an organic material before being dispersed in the polymeric organic material. Such treatments may be used to improve "wetting" of the pigment surface by the polymeric organic material and in the case of coating compositions this leads to improvements in control over pigment flotation and the weathering properties in the dried paint film.

In our earlier Pat. 3,393,162 we have described how solid particles may be treated with a block or graft copolymer comprising components of different degrees of polarity. The treatment is carried out by dispersing the particles in a solution of the copolymer and then modifying the polarity of the solution to precipitate at least one, but not all, the components of the copolymer onto the particle surface. As explained in our earlier specification this process results in attachment to the particles of a solvated polymeric component of the copolymer which improves the stability of the disperse particles in the liquid. Where the treated particles are to be used in coating compositions, the copolymer is so chosen that the final degree of polarity of the liquid is similar to that of the liquid phase of the coating composition so that the precipitated component of the stabilising copolymer remains precipitated on the particle surface and the solvated component remains solvated. Particles treated and used in this way are particularly suitable in coating compositions of the dispersion type in which the film-forming material itself is dispersed in particulate form in the liquid phase of the composition.

We have now found that the properties of the treated particles, for example in respect of "wetting" of the treated particles by the film-forming material dispersion-type coating composition, may be further improved by making a dispersion of the solid particles in a liquid continuous phase comprising an organic liquid containing in solution a polymer which is adsorbed by the particles and a stabiliser, and modifying the polarity of the continuous phase so that the polymer is insoluble therein, the stabiliser being a compound containing an anchor component which becomes associated with the adsorbed polymer on the particle surface and a pendent chain-like component which is solvated by the modified continuous phase and provides a stabilising sheath around the particles.

The solvated chain-like component of the stabiliser may be a polymeric chain or a relatively shorter chain of as few as 12 or 15 co-valently linked atoms in length. In order to be solvated by the organic liquid of the continuous phase, this component should be of a degree of polarity similar to that of the liquid. The anchoring component of the stabiliser is relatively non-solvated by the modified continuous phase and may be a polymer of nature similar to that of the adsorbed polymer and associated therewith by the London or Van der Waal interaction or it may be a component, polymeric or non-polymeric containing polar or di-polar groups which becomes associated with the adsorbed polymer by specific interaction with complementary polar or di-polar groups therein.

Suitable stabilisers for polymers in non-solvent organic liquids are described in more detail in our British Pat. No. 941,305, and in our United States Pat. 3,317,635 and application No. 525,315.

The solid particles may be given their preparatory treatment by making a dispersion of them in a solution in organic liquid of both the polymer to be adsorbed and the stabiliser. The solid particles may be dispersed by grinding, milling or other technique, and at this first stage they are stabilised in disperse form by polymer adsorbed from the solution, the polymer still being solvated by the organic liquid. The particles may, for example, be dispersed in a solution of the polymer and stabiliser in the liquid or preferably they may be dispersed in a solution of the polymer in the liquid, the stabiliser being added after dispersion of the particles.

In the second stage of the preparatory treatment the nature of the continuous phase of the dispersion is modified so that the adsorbed polymer is no longer soluble in it but one component of the stabiliser, i.e. the chain-like stabilising component, is still solvated by it. This modification of the continuous phase may be carried out by adding to the dispersion a liquid which is a non-solvent for the polymer or, if the liquid of the dispersion is a mixture of solvent and non-solvent for the polymer, by removing part or all of the solvent component, e.g. by evaporation or partition.

As a result of the modification in solvency of the continuous phase the anchor component of the stabiliser becomes associated with the polymer adsorbed on the disperse particles whilst the other chain-like component of the stabiliser as described above remains solvated by the liquid forming the continuous phase and provides a stabilising sheath around the particles.

It is preferred that some or all of the polymer to be adsorbed on the particles in the preparatory coating should contain polar groups which will promote adsorption of the polymer on the surface of the solid. Such polar groups include —COOH, —SO$_3$H, —SO$_4$H, —PO$_4$H$_2$, —PO$_3$H$_2$, para-nitrophenyl and —NR$_1$R$_2$, where R$_1$ and R$_2$ may be aryl, aralkyl, alkyl, cycloalkyl or hydrogen or, together, may form a ring structure which optionally may contain a hetero-atom and optionally may be saturated or unsaturated. The type of polar group will be selected in accordance with the solid particles to be treated; for example, acid groups for particles having basic groups on the surface and vice versa. These polar groups may be incorporated in the polymer, for example, by copolymerisation of a minor proportion of a monomer containing such a group either with a main monomer to form a random copolymer or with chains of the polymer containing a copolymersiable group to form a polymeric segment or backbone to which one or more chains of polymer to be adsorbed are attached.

The amount of polymer required to treat the particles will vary with the particle size or surface area of the dispersed particles to be treated. As a general rule, suitable proportions of polymer for adsorption will be in the range 0.001–0.05 gms./m.$^2$ of particle surface, preferably in the range 0.003–0.01 gm./m.$^2$, but as a final check on the suitability of the proportion in any particular case where excess polymer is not desirable a simple test can be applied to dispersions of relatively dense particles, e.g. inorganic particles. This test involves centrifugation of the dispersion after the modification of the continuous phase wherein the relatively dense treated solid particles can readily be separated out leaving the less dense particles of un-adsorbed polymer still in suspension; these are easily detectable and their proportion can be determined on separation by further centrifugation.

Further, in order to ensure adequate stabilisation after the modification step the stabiliser present should provide a chain-like constituent still solvated by the modified continuous phase in a proportion in the range 5% to 100% by weight of the polymer, preferably 10% to 50%. The most suitable proportion to use in any particular case will depend, for example, on the length of the stabilising solvated chain: in general, the longer this is, the more of it will be required.

The size of the disperse solid particles to be treated is not critical; it may range, for example, from a few hundred A. to 10μ.

The main principle to follow in the operation of this invention is that, in general, organic compounds are solvated by or soluble in organic liquids of similar polarity but are not solvated by or soluble in organic liquids of different polarity.

Liquids may be roughly divided up according to their degree of polarity into the following five groups:

| Group | Description | Examples |
|---|---|---|
| 1 | Intensely polar | Water, methanol and dimethyl formamide. |
| 2 | Strongly polar | Lower ketones, e.g. acetone, lower alcohols, e.g. isopropanol. |
| 3 | Moderately polar | Moderate chain length esters, e.g butyl acetate, higher ketones, e.g. diisobutyl ketone. |
| 4 | Weakly polar | Aromatic hydrocarbons, long chain esters, e.g. dicetyl adipate. |
| 5 | Non-polar | Aliphatic hydrocarbons, e.g. white spirit. |

In the case of the polymer to be adsorbed this is initially in solution and so the organic liquid of the solution should be of similar polarity to the polymer. After modification of the liquid forming the continuous phase the adsorbed polymer is insoluble in it and so the liquid is then of dissimilar polarity. In the case of the stabiliser it should initially be soluble as a whole in the organic liquid and yet, after the modification of polarity of the liquid, the chain-like component of the stabiliser should still be solvated by it. The anchor component should, however, like the adsorbed polymer, be non-solvated by the modified liquid and where the anchor component is polymeric it can be essentially similar in chemical structure to the adsorbed polymer.

When, in applying the invention, the polarity of the copolymer solution is modified by addition of liquid of a

| Example | Solid particles | Adsorbed polymer | Stabiliser Anchor component | Stabiliser Stabilising component | Dissolved in | Modified by |
|---|---|---|---|---|---|---|
| 1 | Rutile TiO$_2$ + basic-coated phthalocyanine blue | Random copolymer of methyl methacrylate and methacrylic acid (98:2). | Polymethyl methacrylate | Degraded natural rubber | Xylol | White spirit. |
| 2 | Rutile titanium dioxide | Random copolymer of styrene and methacrylic acid (20:1). | As adsorbed polymer | Polyethylene glycol methacrylate | Acetone/ethanol | Water. |
| 3 | Rutile titanium dioxide | Random copolymer of methyl methacrylate, acrylic acid and acrylamide (70:25.5). | As adsorbed polymer | Polystyrene | Acetone | Xylol. |
| 4 | Antimony oxide | Random copolymer of lauryl methacrylate and methacrylic acid. | Polylauryl methacrylate | Polymethyl methacrylate | Xylol | Ethyl acetate. |
| 5 | Rutile titanium dioxide | Random copolymer of methyl methacrylate and methacrylic acid (1:1). | As adsorbed polymer | Random copolymer of methyl methacrylate and ethyl acrylate (1:1). | Butanol/acetone | Butyl acetate. |
| 6 | Basic-coated phthalocyanine blue | Polymethyl methacrylate chains attached to polyvinyl pyrrolidone backbone. | Polymethyl methacrylate | Polylauryl methacrylate | Toluene | Aliphatic hydrocarbon. |
| 7 | Titanium dioxide | Random copolymer of methyl methacrylate and itaconic acid (98:2). | Polymethyl methacrylate | Tetramer of 12-OH stearic acid | Butyl acetate | Aliphatic hydrocarbon. |
| 8 | Carbon black | Random copolymer of methyl methacrylate and dimethylaminoethyl methacrylate (90:10). | Random copolymer of methyl methacrylate and methacrylic acid (97:3). | Polylauryl methacrylate | Butyl acetate | Aliphatic hydrocarbon. |
| 9 | Red Iron oxide | Random copolymer of methyl methacrylate and methacrylic acid (98:2). | As adsorbed polymer | Polyvinylpyrrolidone | Acetone | Water. |
| 10 | Washed aluminium flake | Random copolymer of methyl methacrylate and methacrylic acid (98:2). | As adsorbed polymer | Polylauryl methacrylate | Ethyl acetate/butyl acetate | Aliphatic hydrocarbon. | different polarity, the objective should generally be to move from one group into or through an adjacent group. Unless the polarity is so modified that at least an adjacent group is entered then the modification is probably insufficient to achieve adequate insolubility of the polymer adsorbed on the particles. On the other hand it is usually not necessary to move further than into the next but one group. It would, in fact, hardly be feasible to move further than into the next group but one, for in general it is difficult to provide a stabiliser wholly soluble in the starting liquid and yet having one component which would still remain solvated after such a radical change in polarity of the liquid.

It will be appreciated that this grouping of liquids according to polarity is rough and arbitrary and that it is used only to illustrate the principle of the invention. More specific forms of the invention are shown by way of example in the following table. These relate to processes in which the particles are dispersed in the polymer solution, the polarity of which is then modified by addition of another liquid.

The proportion of modifying liquid required to be added or removed will vary from system to system but in any particular case, this can be determined by carrying out a simple test in which the same modifying procedure is applied to a sample of the polymer to be adsorbed, the polymer being dissolved in the initial organic liquid but in the absence of the stabiliser and dispersed solid. The solution will be substantially clear but as modification of polarity proceeds a point will be reached when the dissolved polymer passes through the state of critical miscibility and begins to come out of solution, causing it to become opalescent or cloudy. This point represents the minimum proportion of liquid required to be added or removed from the dispersion of particles being treated. Where modifying liquid is being added, still more may be added of course if it is desired to dilute the dispersion further.

In Examples 1–6, 9 and 10 the stabiliser had the structure of a graft copolymer containing on average one of each polymeric component per molecule. In Examples 7 and 8 the anchor component was in the form of a polymeric backbone attached to which were, on average, 10 of the stabilising components each of molecular weight about one-tenth of that of the backbone.

In Examples 1–3, 5 and 9, the particles were dispersed by grinding in a solution of the adsorbed polymer and stabiliser in the organic solvent, the modifying liquid then being added whilst stirring the resulting dispersion.

In Examples 4, 6, 7 and 8, the stabiliser was added after the dispersion stage but prior to modification of the continuous phase.

In Example 10, the aluminium flake, washed to remove stearic acid, was stirred in a refluxing solution of the adsorbed polymer and stabiliser in the organic solvent.

The adsorbed polymers will, in general, be derived from ethylenically unsaturated monomers. Moderately polar polymers are, e.g. those derived from, as the major monomer, esters of unsaturated acid with lower alcohol, e.g. acrylic, methacrylic, ethacrylic and itaconic acid esters of methyl, ethyl, butyl and β-ethoxy ethyl alcohol. Higher esters such as octyl and lauryl give less polar polymers but this can be balanced by copolymerisation with monomer containing highly polar groups, e.g. acrylic, methacrylic, itaconic, maleic, fumaric and crotonic acids. Similar moderately polar polymer is produced from, as major monomer, an ester or ether of an unsaturated lower alcohol, e.g. vinyl alcohol. The esters may be of hydrofluoric acid and lower acids, e.g. acetic, chloracetic, propionic and formic. Where higher acids are used they may be dicarboxylic acid, such as oxalic, the second carboxylic group being left free or a proportion being esterified with a lower alcohol, e.g. methyl or ethyl alcohol. The unsaturated ethers may be simple ethers of a lower 1–4C alkanol, e.g. methyl, ethyl, propyl and butyl vinyl ethers.

Less polar polymers are produced from higher esters of unsaturated acids or alcohols, e.g. lauryl methacrylate or vinyl stearate, or from vinyl benzenes.

More highly polar polymers may be made by polymerisation or copolymerisation of highly polar monomers such as the above-mentioned unsaturated acids themselves or their polar derivatives, such as acid chlorides, amides or methylol amides.

Non-polar polymers include those of hydrocarbons such as styrene, vinyl toluene, divinyl benzene, diisopropenyl benzene, isoprene, butadiene, isobutylene and ethylene.

Other non-polar polymers are those of higher fatty esters of unsaturated acids such as acrylic, methacrylic and ethacrylic acids. In these cases, the alcohol component of the esters contains a long carbon-carbon chain to produce a polymer of suitable non-polarity. Cetyl alcohol is a typical alcohol. Lauryl alcohol is about the lowest alcohol which can be used in homopolymer esters and preferably esters of this alcohol are used as co-monomers with more non-polar monomer. In addition, one can use partial long-chain esters of a polyol, e.g. glyceryl distearate, di-laurate or di-behenate, the remaining hydroxyl of the glycerol being esterified with the unsaturated acid.

Alternatively, one can use higher fatty esters or ethers of unsaturated alcohols such as vinyl and allyl alcohol. Suitable acid components of such esters are stearic acid, behenic acid and mono-esters of di-basic acids such as cetyl or lauryl adipate or sebacate.

Suitable ethers are those of cetyl alcohol or of glycerol distearate, dilaurate or di-behenate.

Where the anchor component of the stabilizer is polymeric it may be similar to the adsorbed polymer so that it is initially in solution and then, after the modification, becomes non-solvated and attracted to the adsorbed polymer by London or Van der Waals interaction. Such stabilisers are essentially block or graft copolymers having one polymeric component which functions as the anchor component and another polymeric component of different polarity which functions as the solvated stabilising component.

Alternatively, the anchor component may comprise one or more polar groups which become associated with the adsorbed polymer by specific interaction with complementary groups therein. The polar and complementary polar groups may be acidic and basic groups, the bond between the stabiliser and adsorbed polymer being the result of protolytic reaction between the two groups. The terms "acidic groups" and "basic groups" are as defined by Bronsted and Lowry, i.e. an acidic group is a species having a tendency to lose a proton and a basic group is a species having a tendency to add on a proton. The protolytic reaction between the two types of groups gives rise to specific associative forces between the stabiliser and the adsorbed polymer. Such protolytic reactions include those commonly referred to as hydrogen bonding.

In the stronger protolytic reactions, the bond energy is the result of interaction between separate fixed charges, one in one polar group and another in the complementary polar group. In another embodiment of this invention similar interactions arise between pairs of opposite charges, i.e. a dipole, in one polar group and pair of opposite charges, i.e. a dipole in the complementary polar groups.

In the stabiliser molecule one or more of the polar groups, the number depending on the bond energy of the group, may be distributed along the solvated chain-like component of the stabiliser. Alternatively, the polar groups may be located in a polymeric segment, or backbone of the stabiliser, in which case the stabiliser may be of block or graft structure. A preferred structure is one in which a high multiplicity, e.g. 10 or more of both polar groups and solvatable chain-like components are distributed along a polymeric backbone.

The specific associative force resulting from the reaction between the polar groups in the stabiliser and adsorbed polymer may be, and usually is, solely or largely responsible for the association between stabiliser and adsorbed polymer, but in some types of stabiliser structure, e.g. those in which a multiplicity of polar groups are located along a polymeric backbone, the backbone if it is of suitable non-solvated nature may provide a supplementary mass-dependent London or Van der Waals associative force of the type described above.

Where the reaction between stabiliser and adsorbed polymer is protolytic suitable types of acidic polar groups include —COOH, —SO$_2$H, —SO$_4$H, —PO$_4$H$_2$ and —PO$_3$H$_2$. The basic polar groups will be essentially of the type found in organic bases, e.g. those of the nitrogen base type will be generally of the structure

where R$_1$ and R$_2$ may be aryl, aralkyl, alkyl, cycloalkyl or hydrogen or, together, may form a ring structure which optionally may contain a hetero-atom and optionally may be saturated or unsaturated. Such basic groups include dimethyl amino, di-isopropyl amino, dihexyl amino, morpholino, piperidino, N-methylbenzyl amino and N-methyl phenyl amino. Other types of basic groups are those occuring in quaternary ammonium bases, substituted guanidine, substituted dicyandiamide, and substituted pyridine.

The absorbed polymer may contain either the acidic group or the basic group and clearly it will be advantageous to incorporate the type of group which will also promote adsorption of the polymer on the particles to be treated. Though the polymer may be a homopolymer of a monomer containing such a group, the group is more conveniently incorporated in smaller proportions by copolymerisation of a suitable proportion of a co-monomer containing the group. The groups must be present in the absorbed polymer in a proportion providing sufficient reactive sites for attachment of the stabiliser and, though the minimum required will vary with the nature of the stabiliser, in practice usually not more than 25% by weight of co-monomer incorporating the reactive group is required, from 0.5–5% by weight of the co-monomer being preferred.

Suitable co-monomers for introducing acidic reaction groups for association with the stabiliser include, in addition to the above-mentioned monomers containing a carboxyl group, those containing a sulphonic group, e.g. vinyl sulphonic acid and styrene sulphonic acid, and those containing a phosphate group such as vinyl phosphate and phosphonic esters of unsaturated OH-containing compounds such as the phosphonic esters of hydroxy isopropyl methacrylate. Suitable co-monomers for introducing basic reaction groups include vinyl pyridine, N,N-dimethyl-aminoethyl methacrylate and tertiary butylamino methyl (meth)acrylate.

Where the reaction between the stabiliser and adsorbed polymer is between dipoles suitable dipolar groups include nitrile, sulphone, nitro, phosphate and sulphonate esters or salts, and ion pairs such as exist in salts, e.g. a metal soap of a fatty acid or a metal soap or quaternary ammonium salt of a sulphonated or phosphonated fatty alcohol or a Zwitter ion.

As in the case of the other polar groups the dipolar groups are also conveniently introduced into the adsorbed polymer by a suitable co-monomer and in some cases the adsorbed polymer may consist essentially of a polymerised monomer containing a dipolar group.

Suitable co-monomers include acrylonitrile, vinyl methyl sulphone, methyl ester of vinyl sulphonic acid, dimethyl ester of vinyl phosphonic acid, dimethyl ester of vinyl phosphate, paranitro benzoic acid ester of vinyl alcohol.

Where the modified liquid of the dispersion is essentially non-polar and contains hydrocarbon, e.g. pentane, hexane, heptane and octane, the following are examples of suitable chain-like components which would be solvated by the liquid:

Long paraffinic chains such as occur in stearic acid; self polyesters of —OH fatty acids such as 12–OH stearic acid or the polyesters occurring in carnauba wax, polyesters of di-acids with diols, e.g. polyesters of sebacic acid with 1,12-decane diol or of adipic acid with neo-pentyl glycol;

Polymers of long chain esters of acrylic or methacrylic acid, e.g. stearyl, lauryl, octyl, 1-ethyl hexyl and hexyl esters of acrylic or methacrylic acid; polymeric vinyl esters;

Polymers of ethylene, propylene, butadiene and isoprene.

The added modifying liquid may, of course, be a commercially available hydrocarbon mixture, such as mineral spirits and white spirit.

Where the modified liquid is essentially weakly polar and contains aromatic hydrocarbon, e.g. xylene and xylene mixtures, benzene, toluene and other alkyl benzenes and solvent naphthas, similar solvatable components may be used and, in addition, shorter chain analogues, e.g. polymers of ethoxy ethyl methacrylate, methyl methacrylate and ethyl acrylae. Other components suitable for use in weakly polar liquids include:

aromatic polyesters, e.g. oil-modified alkyd resins;
aromatic polyethers;
aromatic polycarbonates; and
polymers of styrene and vinyl toluene.

Where the modified liquid is polar and contains an alcohol, ketone or ester, optionally with a proportion of water, suitable solvatable components include:

aliphatic polyethers;
polyesters of short chain acids and alcohols;
polymers of acrylic or methacrylic acid or
short chain alcohol esters thereof;
polyvinyl pyrrolidone.

A wide variety of particular solids may be treated by the process of the invention, especially pigments for use in coating compositions, moulding powders, powder coatings, etc. Typical pigments which may be treated include inorganic types such as titanium dioxide, zinc oxide, antimony oxide, red oxide, yellow oxide, lemon chrome, Prussian blue and cobalt blue, organic types such as azo pigments, quinacridone pigments, indigoid and thio-indigoid pigments and phthalocyanine blues and greens, metal containing organic pigments, lakes, carbon blacks such as vegetable black and metallic powders such as those of aluminium and bronze.

The treated pigments are of particular value in the preparation of pigmented coating compositions. We have found that during the modification step a limited degree of aggregation of the solid particles may take place if the proportion of stabiliser is kept down to a minimum. When a mixture of pigments is treated, therefore, different pigment particles can become incorporated in one aggregate and this aggregation reduces the possibility of pigment separation or migration on application of a coating composition containing the treated pigments and in consequence the defects of flooding and floating are less likely to occur. Controlled aggregation of the particles may be achieved by using a proportion of solvated chain-like stabiliser constituent which is in the lower ranges of the suitable proportions by weight of the adsorbed polymer set out above.

Where the treated pigments are used in dispersion-type coating compositions in which the film-forming polymer is insoluable in and is dispersed in the liquid phase of the coating composition the polymer adsorbed on the treated pigment preferably is compatible with the film-forming polymer and in fact can be essentially of a similar chemical nature. Suitable polymers for use as film-forming polymers can, therefore, be selected from those polymers ilsted above as suitable for adsorbing onto the particles. For example, polymers of esters of acrylic and methacrylic acid, e.g. methyl methacrylate, vinyl acetate, vinyl chloracetate and styrene may be used. In addition, the treated pigments of this inevntion may be used in conjunction with the film-forming polymers which are too insoluble to be used in the treatment of the pigments themselves, e.g. polyvinyl chloride and polyacrylonitrile.

The treated pigments may also be used in solution-type coating compositions provided that the solvent for the film-forming polymer solvates the chain-like component of the stabiliser but does not dissolve and remove the adsorbed polymer.

The invention is illustrated by the following examples:

EXAMPLE 1

A mixture of the following ingredients:

| | Parts |
|---|---|
| Red iron oxide | 14.8 |
| Polymer solution | 2.72 |
| Isobutyl cyclohexanyl phthalate | 9.18 | was vigorously stirred with small glass beads for 15 minutes. The dispersed pigment had a surface area of about 12 m.$^2$/gm. The polymer solution was a 27.2% solids solution of a random copolymer of methyl methacrylate and methacrylic acid (98/2) of molecular weight about 35,000 in a mixture of butyl acetate and ethyl acetate in a proportion of 1:2. There was then added a solution in 3.4 parts butyl acetate of 0.4 part of a stabiliser having a molecular backbone of polymethyl methacrylate of molecular weight about 30,000 to which were attached on average about 20 pendent chains of poly-12-hydroxy stearic acid of molecular weight about 1800. After this solution had been stirred in, 22.25 parts of aliphatic hydrocarbon (boiling point about 75° C.) were then added with continuous stirring.

The random copolymer of methyl methacrylate and methacrylic acid which had become adsorbed onto the pigment particles during the stirring with glass beads was not solvated by the liquid phase after the addition of the hydrocarbon (which is a non-solvent for the copolymer). Further the polymethyl methacrylate backbone of the stabiliser was also not solvated by the final liquid phase and this became associated with the similar adsorbed polymer. However, the poly-12-hydroxy acid chains of the stabiliser were still solvated by the liquid phase after the addition of the hydrocarbon and these provided a stabilising solvated sheath around the disperse particles.

The pigment dispersion was filtered to remove the glass beads and was then incorporated in a dispersion-type paint composition based on a stable dispersion of polymethyl methacrylate in volatile aliphatic hydrocarbon plus plasticiser for the polymer. The paint composition was sprayed onto a steel panel and stoved at 127° C. for 30 minutes. The paint film showed better gloss and colour, both initially and after prolonged exposure, when compared with films prepared from similar paint compositions containing the same pigment dispersed in a conventional manner by grinding it in a solution of rosin ester in aliphatic hydrocarbon.

EXAMPLE 2

4.05 parts of thio indigo red were mixed with 2.69 parts of isobutyl methylcyclohexyl phthalate and a solution in 13.35 parts of butyl acetate of 4.3 parts of a random copolymer of methyl methacrylate and methacrylic acid of molecular weight about 35,000 and 1.7 parts of a graft copolymer comprising polylauryl methacrylate as one polymeric component and a random copolymer of methyl methacrylate and methacrylic acid (98:2) as another polymeric component.

The mixture was ball-milled for 18 hours to disperse the pigment, 26.08 parts of aliphatic hydrocarbon (boiling range 70° C.–90° C.) then being added with stirring.

In this case random copolymer was again adsorbed on the pigment particles and in the final liquid phase, which did not solvate the random copolymer, the particles were stabilised in disperse form by the stabiliser which provided around the particles a sheath of solvated polylauryl methacrylate chains.

When the treated pigment was used in a dispersion-type paint composition as in Example 1, a similar improvement in gloss and colour and in weathering characteristics was observed.

EXAMPLE 3

Example 2 was repeated using 5.0 parts vegetable black pigment in place of the thio indigo red. The black pigment had a surface area of about 34 m.$^2$/gm.

This pigment was used in a paint composition as in Example 1 with similar results.

EXAMPLE 4

15.95 parts rutile titanium dioxide (surface area 10 m.$^2$/gm.) were mixed with 2.57 parts toluene and 2.64 parts of a 30% solution in β-ethoxy ethyl acetate of a polymer having a backbone of polyvinyl pyrrolidone of molecular weight about 100,000 and pendent therefrom on average 10 polymethyl methacrylate chains of molecular weight about 10,000. In this structure the backbone promotes adsorption of the molecule onto the pigment particles. After ball-milling for 18 hours, 0.43 part of the stabiliser used in Example 1 but dissolved in 3.8 parts of toluene were added followed by 29.8 parts of aliphatic hydrocarbon (boiling range 70° C.–90° C.).

In this example the polyvinyl pyrrolidone backbone of the first-mentioned polymer was strongly adsorbed on the pigment surface so attaching to the surface the polymethyl methacrylate chains of the polymer. These latter chains were initially solvated by the liquid phase of the dispersion and so stabilised the disperse particles. On addition of the hydrocarbon these polymethyl methacrylate chains were non-solvated by the resultant liquid phase. Similarly, the polymethyl methacrylate backbone of the stabiliser was non-solvated and became associated with the like polymer chains attached to the pigment surface. However, the poly-12-hydroxy stearic acid chains of the stabiliser remained solvated and provided a solvated stabilising sheath around the pigment particles.

The treated particles were used in a dispersion-type coating composition which showed better gloss and opacity than similar compositions using untreated titanium dioxide.

I claim:

1. A process of producing a dispersion of pigment particles, the particles having adsorbed thereon in a proportion in the range 0.001–0.05 gms. per square meter of particle surface a polymer containing polar groups which is non-solvated by the liquid and being stabilized in disperse form by a stabilizer, and said dispersion being substantially free of particles of said polymer not adsorbed onto said pigment particles, said process comprising making a dispersion of pigment particles in a liquid continuous phase comprising a first organic liquid containing in solution in a proportion in the range 0.001–0.05 gm. per square meter of particle surface said polymer containing polar groups and said stabilizer, and then modifying the polarity of the continuous phase so that the polymer is insoluble therein by adding to the dispersion a liquid which is a non-solvent for the polymer or, if said first liquid is a mixture of solvent and nonsolvent for the polymer, by removing at least part of the solvent, the amount of said polymer being essentially insufficient to form said particles of unabsorbed polymer, the stabilizer being a compound containing:

(a) an anchor component which is solvated by said first liquid and non-solvated by the modified liquid and (i) which is a polymer of nature similar to that of the adsorbed polymer and associated therewith by the London or Van der Waal interaction or (ii)

which is a component containing polar or dipolar groups which become associated with the adsorbed polymer by specific interaction with complementary polar or dipolar groups therein and (b) a pendent chain-like component of at least twelve covalently linked atoms in length which is solvated by said first liquid; and by the modified liquid and is present in a proportion of 5–100% by weight of the adsorbed polymer and provides a stabilizing sheath around the particles.

2. A process as claimed in claim 1 in which the solid particles are dispersed in a solution of the polymer in organic liquid and the stabiliser is then added to the dispersion prior to the modification of the continuous phase.

3. A process as claimed in claim 1 in which the continuous phase is modified by addition of a non-solvent for the polymer.

4. A process as claimed in claim 1 in which the continuous phase is a mixture of solvent and non-solvent for the polymer and is modified by removal of at least part of the solvent.

References Cited

UNITED STATES PATENTS

| | | | |
|---|---|---|---|
| 3,265,644 | 8/1966 | Herman et al. | 260—8 |
| 2,799,662 | 7/1957 | Ernst et al. | |
| 3,232,903 | 2/1966 | Schmidle et al. | 260—33.6 |
| 3,317,635 | 5/1967 | Osmond | 260—34.2 |
| 3,393,162 | 7/1968 | Cox et al. | 260—4 |

FOREIGN PATENTS 941,305  11/1963  Great Britain.

ALLAN LIEBERMAN, Primary Examiner

U.S. Cl. X.R.

260—4, 29.1, 29.6, 31.2, 31.8, 32.8, 33.2, 33.4, 33.6, 37, 40, 41, 41.5